Patented Apr. 16, 1940

2,196,984

UNITED STATES PATENT OFFICE 2,196,984

COLORATION OF TEXTILE MATERIALS

George Holland Ellis, Charles Finley Topham, and Henry Charles Olpin, Spondon, near Derby, England, assignors to Celanese Corporation of America, a corporation of Delaware No Drawing. Application December 28, 1937, Serial No. 182,166. In Great Britain November 30, 1937

11 Claims. (Cl. 8—48)

This invention relates to the coloration of cellulose acetate and other cellulose ester or ether filaments, straws, films and the like, and especially to a method for the production of deep shades on these products.

According to the present invention the aforesaid cellulose ester or ether materials are colored by forming a substantially water-insoluble azo dye thereon from a diazotized amino-azo compound and an N-hydroxyalkyl aniline capable of coupling with a diazo compound in para position to the hydroxyalkylamino group. In this way it is possible to obtain economically a wide range of deep shades, particularly blacks, navy blues, and browns, which have an excellent fastness to light. In relation to the depth of shade obtainable the proportions of the diazo coupling components required based on the weight of the material is low. Such deep shades are difficult to obtain by direct dyeing methods and then only by the use of undesirably large proportions of coloring matter based on the weight of the material; moreover the fastness to rubbing is frequently very poor.

Hydroxyethyl groups are particularly suitable as the hydroxyalkyl substituent of the N-hydroxyalkyl aniline employed as the coupling component. Other hydroxyalkyl groups may be utilised, however, e. g., the hydroxy-propyl group, the β-γ-dihydroxy-propyl group, or the γ-chlor-β-hydroxy-propyl group. The benzene nuclei of the hydroxyalkyl anilines may contain substituents in addition to the hydroxyalkylamino groups. For example alkyl or alkoxy groups may be present in the 3-positions of the benzene nuclei or in both the 3- and 6-positions of the said nuclei. Again, halogen atoms may be present in the 3-positions of the nuclei.

The hydroxyalkyl aniline coupling component may have either one or two hydroxyalkyl groups as substituents in the amino group. Again, the amino group may carry both a hydroxyalkyl group and another substituent, for example an unsubstituted alkyl group, a cyclo-alkyl group, or an aralkyl group, e. g., methyl, ethyl, cyclohexyl, or benzyl.

Specific coupling components which can be used according to the invention are N-di-(hydroxyethyl)-aniline, N-di-(hydroxyethyl)-meta-toluidine, N-di-(hydroxyethyl)-cresidine, and N-di-(hydroxyethyl)-2:5-dimethoxy aniline. The N-di-(hydroxyethyl)-meta-toluidine has been found of particular value.

If desired the hydroxyl groups of the hydroxyalkyl-aniline coupling components may be etherified or esterified. Again, where two or more hydroxy groups are present one hydroxy group may be in the free state and another etherified, e. g., by a methyl group, or esterified, e. g., by an acetyl group.

Diazo components suitable for the purposes of the invention are azo-benzenes, azo-α-naphthalenes and benzene-azo-α-naphthalenes containing one or two diazotisable amino groups in para positions to azo groups. Substituents may be present in addition to the diazotisable amino groups and the azo groups, for example alkyl groups, alkoxy groups, e. g., methoxy or ethoxy groups, halogen atoms, or nitro groups, the latter two types of substituents more particularly in a nucleus which does not contain a diazotisable amino group. Sulphonic and carboxylic groups should be absent.

Of particular value for the purposes of the invention are diazo components of the general formula

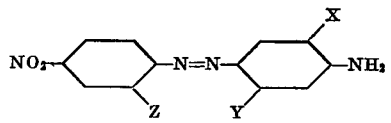

wherein X represents hydrogen, alkoxy, alkyl or halogen, Y represents alkoxy, alkyl, halogen or acidylamino and Z represents hydrogen or halogen. Such amino-azo compounds can readily be prepared by coupling diazotised para-nitraniline, or the appropriate halogen derivative thereof, with the appropriately substituted aniline, e. g., meta-toluidine, cresidine, para-xylidine or 2:5-dimethoxy-aniline.

The following are examples of diazo components which may be employed:

Amino-azo-naphthalene.
Benzene-azo-α-naphthylamine.
2-methoxy-benzene-azo-α-naphthylamine.
4-nitro-benzene-azo-4'-amino-2'-methyl-5'-methoxy-benzene.
4-nitro-2-chlor-benzene-azo-4'-amino-2'-methyl-5'-methoxy-benzene.
4-nitro-benzene-azo-4'-amino-2':5'-dimethoxy-benzene.
4-nitro-2-chlor-benzene-azo-4'-amino-2':5'-dimethoxy-benzene.
4-nitro-2-methoxy-benzene-azo-4'-amino-2':5'-dimethoxy-benzene.
2:4-dinitro-6-chlor-benzene-azo-4'-amino-2'-methyl-5'-methoxy-benzene.
4-nitro-benzene-azo-4'-amino-2':5'-dimethyl-benzene.
4-amino-4'-dimethylamino-azobenzene.

4-amino-4'-diethylamino-azobenzene.
2-methoxy-4-amino-4'-dimethylamino-azobenzene.
2-methoxy-4-amino-4'-diethylamino-azobenzene.
4-amino-4'-di-(hydroxyethyl)-amino-azobenzene.
4-amino-4'-di-(hydroxyethyl)-amino-2'-methylazobenzene.
4-amino-4'-di-(hydroxyethyl)-amino-2'-chlorazobenzene.
2-chlor-4-amino-4'-di-(hydroxyethyl)-amino-azobenzene.
2-chlor-4-amino-4'-di(hydroxyethyl)-amino-2'-methyl-azobenzene.
4:4'-diamino-3:6-dimethyl-azobenzene.
4:4'-diamino-3-methoxy-6-methyl-azobenzene.
4:4'-diamino-2'-chlor-3-methoxy-6-methyl-azobenzene.
4:4'-diamino-3:6-dimethoxy-azobenzene.
4:4'-diamino-2'-chlor-3:6-dimethoxy-azobenzene.
4-amino-benzene-azo-α-naphthylamine.

We have further found that valuable colorations may also be obtained by using as the diazo component instead of an amino-azo compound a para-amino diarylamine. Examples of such compounds are, for instance, 4-amino-4'-methoxy- or ethoxy-diphenylamine, 4:4'-diamino-diphenylamine, and 1-amino- or 1-alkylamino- or 1-hydroxy-alkylamino-4-(4'-amino-phenylamino)-anthraquinones, for example 1-methylamino-4-(4'-amino-phenylamino)-anthraquinone. This latter compound yields with di-(hydroxyethyl)-metatoluidine valuable green shades.

The following table shows the shades obtainable on cellulose acetate from certain combinations of diazo component and coupling component in accordance with the invention:

If desired the diazo components may be applied to the materials from solutions in organic solvents in the manner described in U. S. application S. No. 154,280 filed July 17, 1937.

Dyeings produced in accordance with the invention can be topped with other dyes, particularly water-insoluble dyes having direct affinity for the material, for the purpose of modifying the shade.

The invention is illustrated by the following examples:

Example 1

20 parts of finely milled 10% aqueous paste of 4-nitro-2-chlor-benzene-azo-4'-amino-2'-methyl-5'-methoxybenzene is dispersed in 3,000 parts of water with the aid of soap and Turkey red oil. 100 parts of cellulose acetate fabric is dyed in this bath at 78 to 80° C. for about 2 hours. The material is then lifted and diazotised for 30 minutes at ordinary temperature in a 15:1 bath containing 20% of concentrated hydrochloric acid and 5% of sodium nitrite based on the weight of the goods. The diazotised material is then washed well and worked in a bath of 2 parts of di-(hydroxyethyl)-metatoluidine in 3,000 parts of water and 0.75 part of soda ash first for 20 minutes in the cold, then for 20 minutes while heating up to 60° C. and finally for half an hour at 60° C. The fabric is then soaped and dried. A full reddish blue shade is thus obtained.

Example 2

100 parts of a cellulose acetate fabric is dyed in the manner described in Example 1 but using 10 parts of the 10% aqueous paste of 4-nitro-2-chlorbenzene-azo-4'-amino-2'-methyl-5'-methoxy-benzene in place of the 20 parts specified.

| Diazo component | Coupling component | Shade |
| --- | --- | --- |
| Amino-azo-naphthalene | N-di-(hydroxyethyl)-3-toluidine | Plum. |
| Do | N-di-(hydroxyethyl)-cresidine | Do. |
| Do | N-di-(hydroxyethyl)-2:5-dimethoxyaniline | Black. |
| Do | N-di-(hydroxyethyl)-3-toluidine | Maroon. |
| Benzene-azo-α-naphthylamine | N-di-(hydroxyethyl)-aniline | Deep red. |
| Do | N-di-(hydroxyethyl)-3-toluidine | Maroon. |
| 2-methoxybenzene-azo-α-naphthylamine | do | Brownish black. |
| 4-nitro-benzene-azo-4'-amino-2'-methyl-5'-methoxybenzene | N-di-(hydroxyethyl)-cresidine | Do. |
| Do | N-di-(hydroxyethyl)-3-toluidine | Navy. |
| 4-nitro-2-chlorbenzene-azo-4'-amino-2'-methyl-5'-methoxybenzene | do | Black. |
| 4-nitro-benzene-azo-4'-amino-2':5'-dimethoxybenzene | do | Reddish black. |
| 4:4'-diamino-2'-chlor-3-methoxy-6-methylazobenzene | do | Black. |
| 4:4'-diamino-3:6-dimethoxy-azobenzene | do | Deep violet. |
| 4:4'-diamino-2'-chlor-3:6-dimethoxy-azobenzene | do | |

Preferably the components used are free from nuclear hydroxyl groups.

As regards the procedure to be followed in forming the azo dyes on the cellulose ester or ether materials, we prefer to incorporate the diazo component in the material and then to effect diazotisation and couple with a coupling component in a separate bath.

The diazo components can be applied to the materials in the form of aqueous dispersions. Bath methods may be employed, that is to say methods in which the materials are allowed to absorb the diazo component from an aqueous dispersion of the latter in which they are immersed. Again, mechanical impregnation methods may be used, the materials being impregnated with the requisite proportion of diazo component in an amount of liquid which is not greater than can be retained by the materials. To this end padding or printing methods may be utilised. The impregnated material may then be aged or steamed to cause the diazo component to enter the cellulose ester or ether material.

The reddish blue dyeing is then topped with 7 parts of a 10% aqueous paste of the azo dye from diazotized 6-ethoxy-2-aminobenzthiazol and N-hydroxyethyl-3:7-dihydroxy-1:2:3:4-tetrahydro-o-naphthoquinoline. The material is thus dyed in a full navy blue, of excellent night shade, which is dischargeable to white by means of soluble zinc formaldehyde sulphoxylate.

The materials processed in accordance with the invention may be made from various cellulose esters or ethers, for example cellulose acetate, formate, propionate or butyrate, or methyl, ethyl or benzyl cellulose. The filaments or the like can be such as are directly produced by spinning solutions of cellulose esters or ethers or products which have been made by stretching already formed cellulose ester or ether filaments or the like in the presence of organic softening agents for the material, or in the presence of steam or hot water. Again, the cellulose esters or ethers may be those in which the cellulose has been esterified, etherified, or both esterified and etherified to a high degree. Such products are those made by esterifying formed filaments, yarns, foils, films and similar materials having a basis of organic derivatives of cellulose as described, for instance, in U. S. applications S. Nos. 39,288, 39,289 and 39,290, all filed September 5, 1935.

Particular mention may be made of the products obtainable by subjecting cellulose acetate textile materials to the action of acetic anhydride in the manner described in U. S. application S. No. 39,290.

The new process is also of value in the case of coloring the cellulose ester or ether in mixed materials containing both cellulose ester or ether and another material, for example silk, wool, cotton, or regenerated cellulose.

Having described our invention what we desire to secure by Letters Patent is:

1. Process for the coloration of cellulose ester or ether materials, which comprises coupling thereon a hydroxyalkyl aniline, capable of coupling in para position to the hydroxyalkylamino group, with a compound selected from the group consisting of diazotized amino-azo compounds of which the aromatic nuclei are all of the benzene series, diazotized amino-azo compounds of which the aromatic nuclei are all of the napthalene series, diazotized amino-azo compounds of which some of the aromatic nuclei are of the benzene series while the others are of the naphthalene series, and diazotized amino diarylamines.

2. Process for the coloration of cellulose acetate materials, which comprises coupling thereon a diazotized monoamino-azo benzene with a hydroxyalkyl aniline capable of coupling in para position to the hydroxyalkylamino group.

3. Process for the coloration of cellulose ester or ether materials, which comprises coupling thereon a hydroxy-alkyl-aniline, capable of coupling in para position to the amino group and free from nuclear hydroxyl groups, with a diazotized amine of the formula

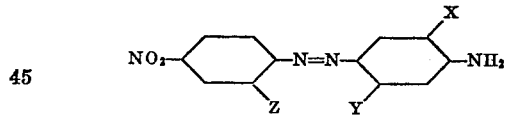

wherein X represents a member of the groups consisting of hydrogen, alkoxy, alkyl, and halogen, Y represents a member of the group consisting of alkoxy, alkyl, acidylamino and halogen, and Z represents a member of the group consisting of hydrogen and halogen.

4. Process for the coloration of cellulose acetate materials, which comprises coupling thereon a di-(hydroxyalkyl)-aniline capable of coupling in para position to the amino group and free from nuclear hydroxyl groups with a diazotized amine of the formula

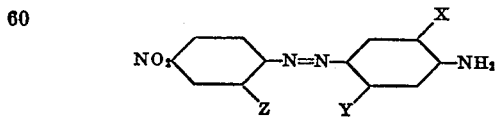

wherein X represents a member of the group consisting of hydrogen, alkoxy, alkyl, and halogen, Y represents a member of the group consisting of alkoxy, alkyl, acidylamino and halogen, and Z represents a member of the group consisting of hydrogen and halogen.

5. Process for the coloration of cellulose ester or ether materials, which comprises coupling thereon di-(hydroxyethyl)-m-toluidine with a diazotized amine of the formula

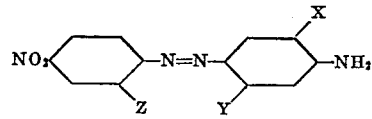

wherein X represents a member of the group consisting of hydrogen, alkoxy, alkyl, and halogen, Y represents a member of the group consisting of alkoxy, alkyl, acidylamino and halogen, and Z represents a member of the group consisting of hydrogen and halogen.

6. Process for the coloration of cellulose ester or ether materials, which comprises coupling thereon a hydroxyalkyl aniline, capable of coupling in para position to the amino group and free from nuclear hydroxyl groups, with a diazotized amine of the formula

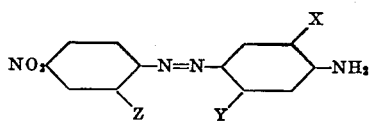

wherein X represents alkoxy, Y represents alkyl and Z represents hydrogen or halogen.

7. Process for the coloration of cellulose acetate materials, which comprises coupling thereon diazotized 4-nitro-2-chlorbenzene-azo-4'-amino-2'-methyl-5'-methoxybenzene with di-(hydroxyethyl)-m-toluidine.

8. Process for the coloration of cellulose acetate materials, which comprises coupling thereon a di-(hydroxyalkyl)-aniline capable of coupling in para position to the amino group and free from nuclear hydroxyl groups, with a diazotized benzene-azo-α-naphthylamine.

9. Process for the coloration of cellulose acetate materials, which comprises coupling thereon a di-(hydroxyalkyl)-aniline capable of coupling in para position to the amino group and free from nuclear hydroxyl groups, with diazotized 4-nitro-2-chlor-benzene-azo-α-naphthalamine.

10. Process for the coloration of cellulose acetate materials, which comprises coupling thereon di-(hydroxyethyl)-m-toluidine with diazotized 4-nitro-2-chlor-benzene-azo-α-naphthylamine.

11. Process for the coloration of cellulose acetate materials, which comprises coupling thereon di-(hydroxyethyl)-m-toluidine with diazotized 1-methylamino - 4 - (4' - a m i n o - phenylamino) - anthraquinone.

GEORGE HOLLAND ELLIS.
CHARLES FINLEY TOPHAM.
HENRY CHARLES OLPIN.

CERTIFICATE OF CORRECTION.

Patent No. 2,196,984.   April 16, 1940.

GEORGE HOLLAND ELLIS, ET AL.

It is hereby certified that error appears in the printed specification of the above numbered patent requiring correction as follows: Page 3, first column, line 48, claim 3, for the word "groups" read --group--; and second column, lines 34 and 35, claim 6, strike out "wherein X represents alkoxy, Y represents alkyl and Z represents hydrogen or halogen" and insert instead --wherein X represents a member of the group consisting of hydrogen, alkoxy, alkyl, and halogen, Y represents a member of the group consisting of alkoxy, alkyl, acidylamino and halogen, and Z represents a member of the group consisting of hydrogen and halogen--; and that the said Letters Patent should be read with this correction therein that the same may conform to the record of the case in the Patent Office.

Signed and sealed this 25th day of June, A. D. 1940.

(Seal)

Henry Van Arsdale,
Acting Commissioner of Patents.